No. 885,657. PATENTED APR. 21, 1908.
J. WOOD.
MAIL BAG CATCHER AND DELIVERER.
APPLICATION FILED OCT. 31, 1907.
3 SHEETS—SHEET 1.
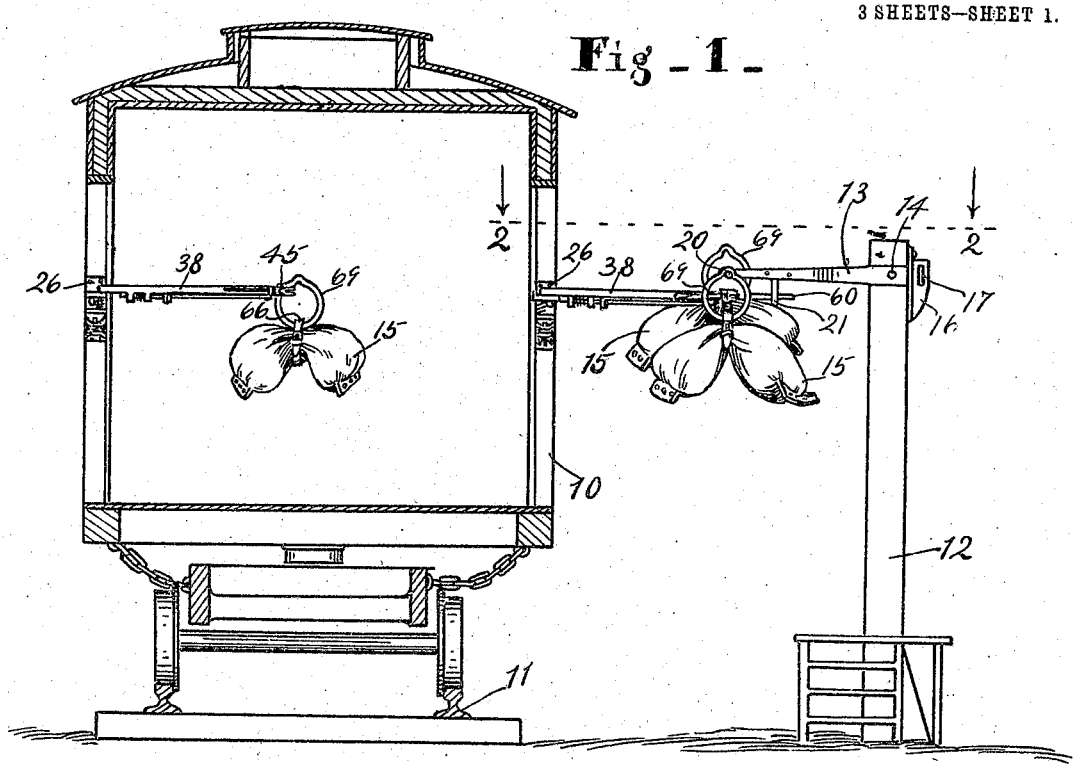
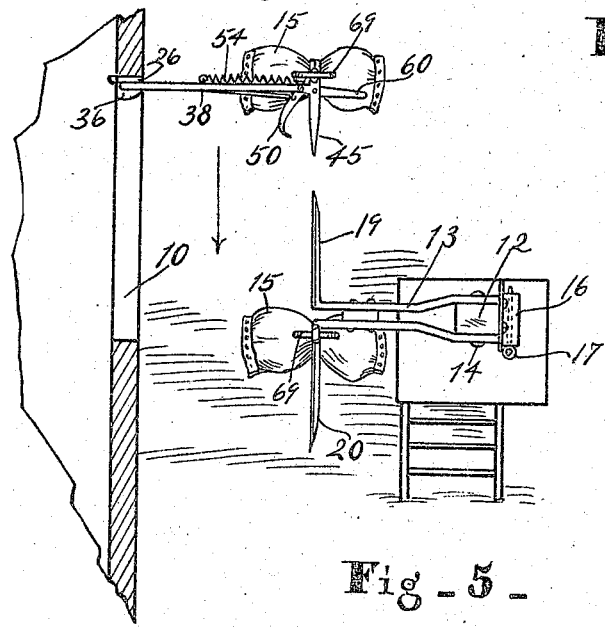
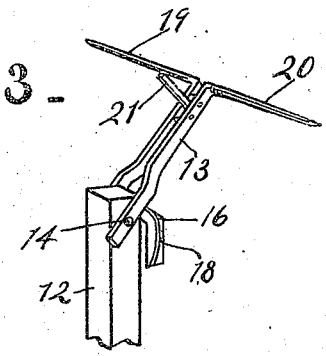
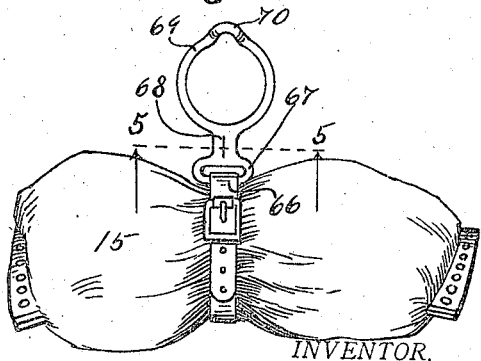
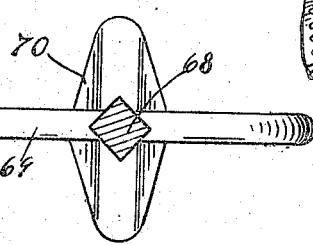
WITNESSES:
W. M. Gentle.
N. Allemong.
INVENTOR.
James Wood
BY
V. H. Lockwood
ATTORNEY.

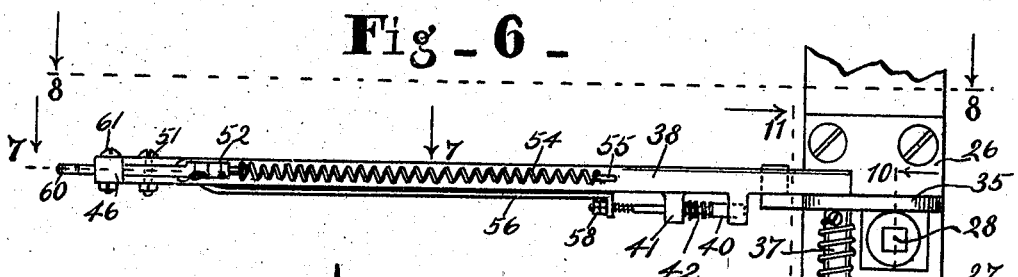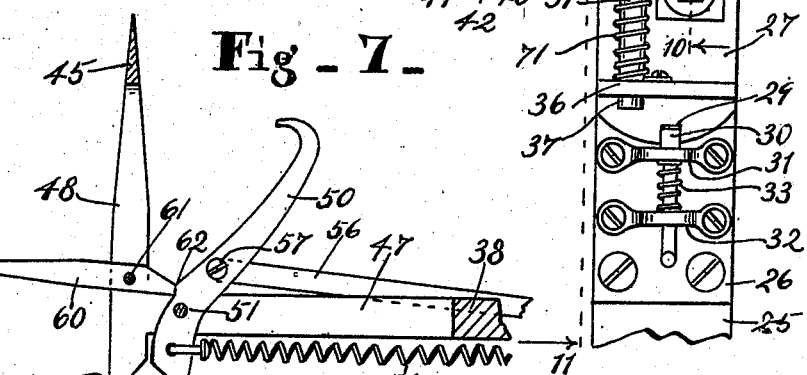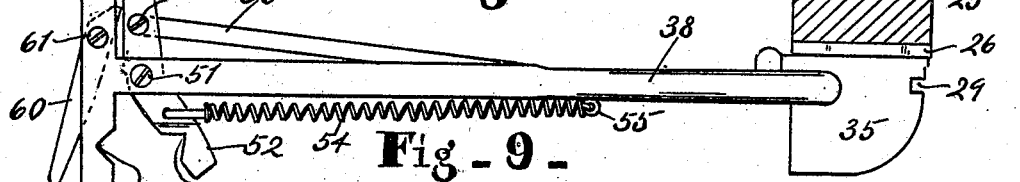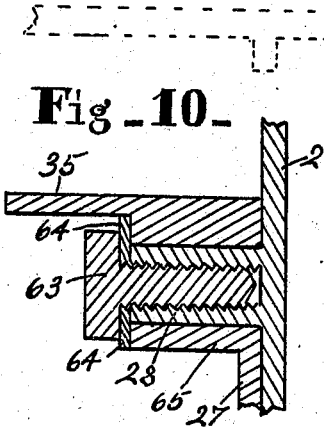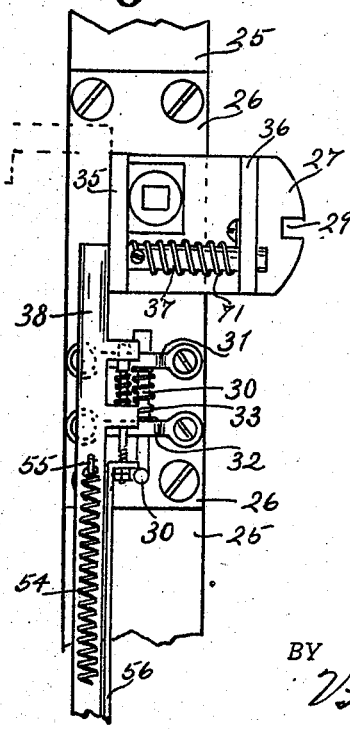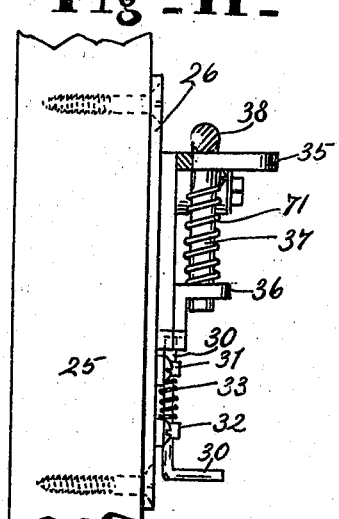

No. 885,657. PATENTED APR. 21, 1908.
J. WOOD.
MAIL BAG CATCHER AND DELIVERER.
APPLICATION FILED OCT. 31, 1907.
3 SHEETS—SHEET 3.
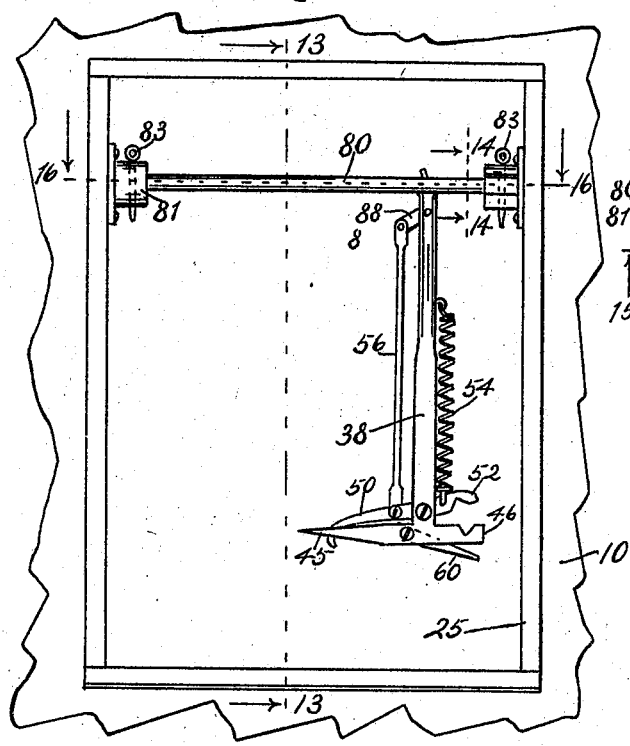
Fig. 12.
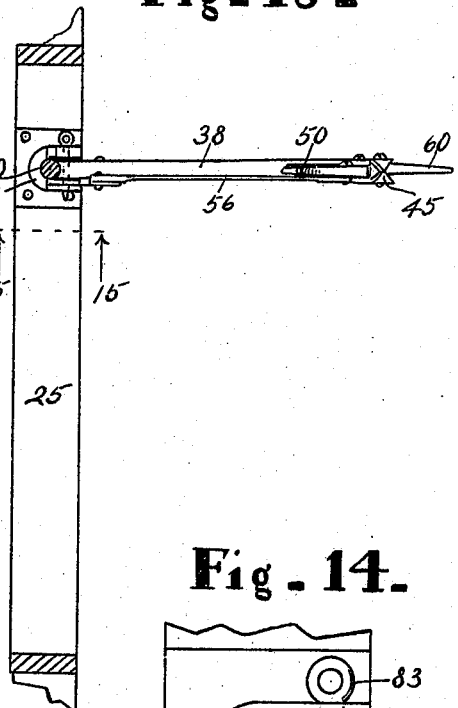
Fig. 13.
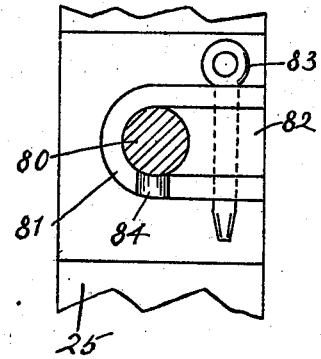
Fig. 14.
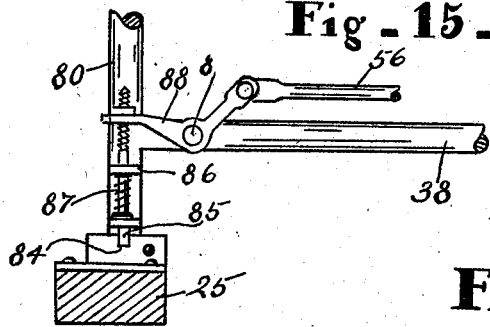
Fig. 15.
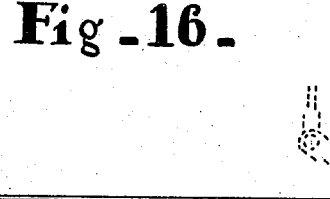
Fig. 16.
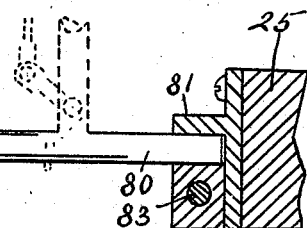
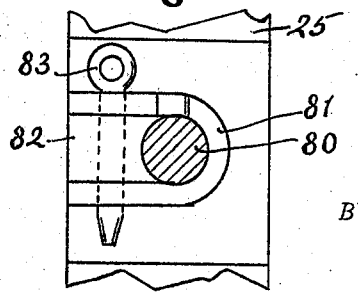
Fig. 17.
WITNESSES:
W. M. Gentle.
N. Allemong.
INVENTOR.
James Wood.
BY
V. H. Lockwood
ATTORNEY.

UNITED STATES PATENT OFFICE.

JAMES WOOD, OF NOBLESVILLE, INDIANA, ASSIGNOR OF ONE-HALF TO JOHN OWEN, OF NOBLESVILLE, INDIANA.

MAIL-BAG CATCHER AND DELIVERER.

No. 885,657.      Specification of Letters Patent.      Patented April 21, 1908.

Application filed October 31, 1907. Serial No. 400,075.

*To all whom it may concern:*

Be it known that I, JAMES WOOD, of Noblesville, county of Hamilton, and State of Indiana, have invented a certain new and useful Mail-Bag Catcher and Deliverer; and I do hereby declare that the following is a full, clear, and exact description thereof, reference being had to the accompanying drawings, in which like letters refer to like parts.

The object of this invention is to provide a satisfactory device for the simultaneous receipt and delivery of mail bags and the like. It is a single device attached to the mail car provided with means for holding the bag to be discharged and catching the bag to be received.

While the chief object is to simultaneously discharge a bag and receive another bag, of course the device may be used either to discharge a bag or to receive a bag or do both as the occasion requires.

One feature of the device is to enable the mail clerk in the car to place the bag to be delivered on the device and push the device outwardly in position and then the mail clerk can dismiss the matter from his mind and go on to other business in the car and the apparatus will do the rest, that is, it will discharge the bag which it carried and pick up a bag and turn itself back into the car so that the bag may be removed therefrom when the clerk desires to do so. In other words, with this construction the clerk is not required to hold the device in position or to give it any attention after he has turned it outward from the car.

Another feature of the invention consists in the peculiar mechanism for holding and receiving bags, said mechanism being simultaneously operated by the same means and the release of one bag and the catching of another is effected by a single means operating simultaneously. And yet said means firmly holds the bag to be delivered until time for delivery and firmly holds the bag to be received after it has been caught so that it cannot escape. This enables a bag to be delivered and another one caught by this single device while the car is going at high speed.

Another feature of the invention consists in combining with said bag delivering and catching device on the car stationary means beside the track for receiving and holding the bags and also for causing the operation of the device which is on the car, whereby a bag is delivered and another caught.

In the modified form herein shown the arm for delivering and receiving mail bags is arranged to oscillate vertically so it can be used in narrow door ways.

The full nature of the invention will be understood from the accompanying drawings and the following description and claims:

In the drawings Figure 1 is a central transverse section through a mail car provided with my catching and delivering device on each side of the car and showing the post beside the car and the parts in position for the simultaneous discharge and receipt of two mail bags. Fig. 2 is a horizontal section on the line 2—2 of Fig. 1, showing the position of the parts as the bag is to be discharged and another caught. Fig. 3 is a perspective view of the upper part of a mail bag post with the arm thrown upward and back away from the train when not in use. Fig 4 is a side elevation of a mail bag and the ring for holding the same. Fig. 5 is a horizontal section on the line 5—5 of Fig. 4. Fig. 6 is an elevation of a portion of the door casing of the mail car and of my discharging and receiving device mounted thereon and extending outward ready to discharge and receive a bag. Fig. 7 is a horizontal section on the line 7—7 of Fig. 6, showing the parts in altered position while holding the bag to be discharged. Fig. 8 is a plan view of the discharging and receiving arm in its position after operation and a section of the door casing on the line 8—8 of Fig. 6. Fig. 9 is an elevation of the parts shown in Fig. 6 with the discharging and receiving arm turned downward to its unoperated position, its inward position being shown by dotted lines and parts being broken away. Fig. 10 is a vertical section on the line 10—10 of Fig. 6. Fig. 11 is a side elevation of the door casing and parts attached, parts being in section on the line 11—11 of Fig. 6. Fig. 12 is a side elevation of a part of the mail car showing a modified mounting of the device for receiving and delivering mail bags. Fig. 13 is a vertical section on the line 13—13 of Fig. 12 with the arm extending outwardly. Fig. 14 is a detail showing the manner of mounting the cross rod that carries the arm, said cross rod being in section and parts being broken away. Fig. 15 is a section on the line 15—15 of Fig. 13. Fig. 16 is a section on the line 16—16 of Fig. 12. Fig. 17 is the same as Fig. 14 except that it represents a bearing at the other end of the bar on which the mail bag is mounted.

In Fig. 1 there appears a mail car 10 on a railway 11 and beside said railway there is a post 12 carrying a mail bag arm 13 pivoted thereto on the pin 14. Said mail bag arm is, when in disuse, thrown upwardly and backwardly as shown in Fig. 3, whereby it will be out of the way of passing cars. When it is desired to hang the mail bag 15 thereon, it is turned to the horizontal position shown in Fig. 3 and is held in that position by the slotted bracket 16 secured at the back of the post near the upper end, said bracket having vertical slots into which the rear ends of the arm 13 project when said arm is in its horizontal position. Said arm is locked in its horizontal position by the removable pin 17 that is insertible through the holes 18 and in said bracket under or through the rearward ends of the arm 13. Said stationary mail bag arm 13 is provided with two horizontal and oppositely extending fingers 19 and 20 that are parallel with the railway and the trip finger 21 that extends downwardly when the arm is in its operating position, as shown in Fig. 1, said finger 21 having for its function the tripping of the mechanism carried by the car for discharging and catching mail bags.

On the face of the door casing 25 of the car a metal plate 26 is secured. A bracket plate 27 is pivoted upon the plate 26 by the tubular bearing 28, which is horizontal so that the plate 27 may be swung in a vertical plane. As seen in Fig. 10, the screw 63 enters said tubular sleeve 28 and clamps the washer 64 against the tubular boss 65 that projects upwardly from said plate 27. Its lower end is curved so as to be convex and midway has the notch 29 to receive the locking bolt 30 that is mounted so as to be vertically reciprocable through the two bars 31 and 32 secured to the plate 26 and is spring-pressed upward by the spring 33. It is pulled downwardly by applying the fingers to the turned lower end of said locking bolt 30, as seen in Fig. 11. The bracket plate 27 has two horizontal flanges or brackets 35 and 36, one above the other and parallel and provided with holes one above the other for the turned end 37 of the bag-discharging and receiving arm 38. The upper one of these brackets 35 is in the shape of a quadrant and on the outer side there is a notch 39 in its edge to receive the locking bolt 40 that is reciprocably mounted in the lugs 41 on the under side of the arm 38 and locks the bag discharging and receiving arm in its outward position, as shown in Fig. 1. Said bolt 40 is spring-pressed by the spring 42 into engagement with said notch 39. Said arm 38 carries on its extreme end the finger 45 and heel or projection 46 at a right angle with said arm, as shown in Fig. 8. Said parts 45 and 46 are in line with each other and extend in opposite directions from the end of the arm 38 and are preferably integral with each other and with the arm 38. The outer end of said arm 38 is provided with a horizontal slot 47 and said parts 45 and 46 are provided with a horizontal slot 48 as indicated in Fig. 7. The finger 45 is pointed while the heel or projection 46 has on its inner surface an angular notch 49.

A hook 50 is pivoted by the pin 51 to the arm 38 in the slot 47 thereof, as shown in Fig. 7, and has a heel or projection 52 that corresponds and coöperates with the heel or projection 46 and has a notch 53 in its outer surface that registers with the notch 49. The hook 50 coöperates with the finger 45 to grab and hold the mail bag that is to be received. When released, said hook 50 is thrown into holding position by the spring 54 that at one end is secured to the heel or projection 52 and at the other end fastened to the eye 55 secured to the arm 38. There is also a bar 56 pivoted by the pin 57 to the hook 50 on the side of the pivot 51 opposite the attachment of the spring 54. Said bar 56 at its other end is adjustably connected with the bolt 40 by said bolt being threaded and extending through a threaded hole in the end of bar 56 and nuts 58 being placed upon said bolt 40.

A trip 60 is pivoted between its ends in the slot in the finger 45 by the pin 61, as seen in Figs. 7 and 8. The inner end of said trip engages a shoulder 62 on the hook 50 near the fulcrum 51 and opposite the connection of the spring 54. A spring 71 on the turned down end 37 of the arm 38 is secured at its lower end to the plate 36 and at the upper end to said bar 37 in such manner as to throw the arm 38 from the outward position shown in Fig. 1 around into the car, as shown at the left hand of Fig. 1 from the outward position shown at the right hand of Fig. 1.

The mail bag is held by the leather strip 66 that passes through the eye 67 on the square shank 68 secured to a ring 69. The shank in cross section is as shown in Fig. 5 and the ring is large relatively and has a laterally extending plate 70 secured to it on its upper side, as shown in Figs. 4 and 5.

The operation of the device will now be explained.

While the arm is extending inwardly the mail clerk secures the bag to be discharged to one of the rings 69 and places the square shank 68 thereof between the projections 46 and 52 in the notches 49 and 53 and draws the hook 50 back to the position shown in Fig. 7 and moves the trip 60 into locking position, as shown in that figure. Thereby the bag will be firmly held so that the ring thereof cannot rotate but will extend transversely of a line through the finger 45. He then swings the arm around from the inward position to the outward position, shown in Figs. 1 and 2 and as he does so the locking bolt 33 will spring into the notch 29 and hold said arm in said upward position until the bag has been discharged. The postman at the station where the bag is to be delivered pulls the arm 13 down from its upper position, shown in Fig. 3, to the horizontal position shown in Fig. 2 and places the bag to be received thereon, that is, on that one of the fingers 19 or 20 that points in the direction in which the train, which is to pick up the bag, will move. At the same time the other one of said two fingers points rearwardly, as shown in Fig. 2, in position to receive the bag to be discharged. As the train moves by the post 12 the finger 45 on the arm extending from the car travels under the fingers 19 and 20 and penetrates the ring 69 on the other bag carried by the car and rides over the rearwardly extending finger 20 in the arm from the post and the trip 60 on the arm carried by the car strikes the trip 21 on the arm carried by the post, whereby the hook 50 is released and is thrown by the spring 54 very quickly from the position shown in Fig. 7 to that shown in Fig. 8. That sudden movement of the hook 50 causes it to catch the ring 19 of the bag which has been picked up on the finger 45 and causes the projection or heel 52 to release the shank 68 of the ring on the bag that has been received by the finger 19 on the arm of the post. That leaves the discharged bag on the post and the received bag caught by the finger 45 and hook 50. As said movement of the hook 50 occurs, the bar 56 withdraws the locking bolt 40, whereupon the arm 38 with the receiving bag is turned horizontally into the car by the spring 71 to the position shown at the left hand of Fig. 1. Thereupon, the mail clerk, when he wishes, to do so, removes the mail bag which was received. After having removed the bag he can, if he desires, withdraw the locking bolt 40 downward and thus let the arm 38 swing downwardly beside the door casing, as shown in Fig. 9, and be out of the way until it needs to be used again.

The plate 70 secured to the ring 69 transversely thereof is for the purpose of causing the ring to be vertical while it is hanging on one of the fingers 19 or 20 connected with the post and to enable the finger 45 of the catching device on the car to surely enter the ring. The bag to be taken up by the car must be so placed on one of the fingers 19 or 20 with relation to the trip 21 as to cause the finger 45 to enter the ring of the mail bag to be received before the trip 69 engages the trip 21, for it is necessary that the finger 45 enter the ring far enough and before the hook 50 is operated to cause said hook to catch said ring on the finger 45 and hold the mail bag.

In the modified form, shown in Figs. 12 to 17, the arm 38 swings downwardly or oscillates vertically instead of horizontally, as in the preceding figures. This arrangement of the mechanism is preferable when the door of the mail car is narrow, as many of them are too narrow to receive the mail bag on a horizontally oscillatory arm. The variations in the construction to bring about this modified arrangement are very few. In the first place arm 38 is secured to cross rod 80 which extends transversely of the door and is mounted near the upper end thereof in two U-shaped bearings 81, as shown in Fig. 14. One of these bearings points outwardly and the other inwardly and in each bearing the rod 80 is held in place by a removable block 82 locked in place by a bolt 83. In each bracket there is a notch 84 under the cross rod to receive the spring bolt 85 mounted in ears 86 on the under side of the cross rod 80. It is actuated by the spring 87 and is released by the bell crank 88 pivoted at 89 and operated by the connecting rod or bar 56. This locking mechanism is the same in general nature as that shown in Fig. 6.

In this modified form the rod 80 may be taken out and turned around so as to operate and then the spring bolt will engage in the notch on the upper side of the bracket 81 in Fig. 17.

What I claim as my invention and desire to secure by Letters Patent is:

1. A device for delivering mail bags from cars having means permanently mounted thereon adapted to grip and hold the mail bag outwardly from the car, and means beside the railway for engaging and actuating said gripping and holding means for releasing the mail bag.

2. A device for delivering mail bags from cars having means permanently mounted thereon adapted to grip and hold the mail bag outwardly from the car, means beside the railway for engaging and actuating said gripping and holding means for releasing the mail bag, and means for receiving the said mail bag after it has been released.

3. A device for delivering mail bags from cars having means permanently mounted thereon adapted to grip and hold the mail bag outwardly from the car, and a single means mounted beside the railway for engaging and actuating said device to release the mail bag and for receiving the bag after it has been released.

4. A device for delivering mail bags from cars having means adapted to grip and hold the bag outwardly from the car, and an arm mounted beside the railway and projecting towards the same with a horizontal finger parallel with the railway for receiving the mail bag, and a downwardly extending trip for releasing the bag holding means from the car.

5. A device for delivering mail bags from cars provided with an arm adapted to extend outwardly from the car with a projection on the outer end extending transversely of said arm, a spring-withdrawn means adapted to coöperate with said projection for holding a mail bag to be delivered, a trip for holding said means in its gripping position, and means beside the railway for releasing said trip.

6. A device for delivering mail bags from cars provided with an arm adapted to extend outwardly from the car with a projection on the outer end extending transversely of said arm, a spring-withdrawn member pivoted on said arm and coöperating with said projection for holding between them a mail bag, said projecting member having corresponding notches for holding the mail bag, a trip bar pivoted at the outer end of said arm with one end adapted to be moved into locking engagement with the bag holding member and the other end adapted to project outwardly from the end of said arm, and means beside the track for engaging and releasing said trip bar.

7. A device for delivering mail bags from cars having an arm extending outwardly from the car, a ring connected with the mail bag which is adapted to be received by means mounted beside the railway, an angular shank to said ring, and means on said arm provided with angular notches for gripping said shank and holding said ring vertical and in a plane transversely of the railway.

8. A device on a car for receiving mail bags having a stationary finger adapted to extend parallel with the railway for receiving the mail bag, a spring-actuated hook that coöperates with said finger after it has received the mail bag thereon for holding the mail bag, a pivoted trip adapted to hold said hook in its inoperative position, and means beside the railway for engaging and releasing said trip.

9. In a device of the kind, a device adapted to extend from the mail car that is horizontally slotted in its outer end, a horizontal finger secured to the outer end of said arm and at a right angle therewith, said finger being slotted, a hook pivoted in the slot of said arm that is adapted to engage with said finger for holding the mail bag after it has been received, a spring that tends to actuate said grip to its gripping position, a trip bar pivoted in said finger, one end engaging and holding the hook in its inoperative position and the other end projecting outward from said finger, and means beside the railway track for engaging and releasing said trip.

10. In a device of the kind, a device adapted to extend from the mail car that is horizontally slotted in its outer end, a horizontal finger secured to the outer end of said arm and at a right angle therewith, said finger being slotted, a hook pivoted in the slot of said arm that is adapted to engage with said finger for holding the mail bag after it has been received, a spring that tends to actuate said grip to its gripping position, a trip bar pivoted in said finger, one end engaging and holding the hook in its inoperative position and the other projecting outward from said finger, means beside the railway track for holding the mail bag in position to be received by said finger, and a tripping means positioned in relation to said bag holding means that is adapted to engage and release the trip on said bag receiving device after the said finger has partially received the bag, whereby said hook will not be released until the bag is in position to be gripped thereby.

11. A device adapted to extend outwardly from a car to receive mail bags having an arm with a horizontal finger at the outer end thereof at a right angle to said arm, a finger beside the railway track in close proximity to the path of the finger on said arm, a ring adapted to be secured to the mail bag and hung upon said finger beside the railway, and a concave plate secured to the upper side of said ring and at a right angle therewith that is adapted to rest upon the finger beside the railway, whereby said ring will be maintained vertically and in a plane transversely of the railway, so that the ring will always be in position to be penetrated by the finger carried by the car.

12. A device for receiving bags that is pivotally mounted in connection with the car so as to swing horizontally inwardly and outwardly, a spring tending to draw it inwardly, a catch for locking it in its inward position, and means beside the railway for releasing said catch.

13. The combination with a car of an arm adapted to extend outwardly therefrom having on its outer end a forwardly projecting finger to receive the mail bag and a rearward projection, and single means pivoted in connection with said arm for coöperating with said rearward projection to hold the mail bag and with the forward finger for catching the mail bag.

14. The combination with a car, of an arm adapted to extend outwardly therefrom having on its outer end a forwardly projecting finger to receive the mail bag and a rearward projection, a hook-shaped lever fulcrumed in connection with said arm with one end coöperating with said rearward projection for holding a mail bag and the other end adapted to coöperate with said forwardly projecting finger for catching the mail bag, a trip adapted to be operated by means beside the railway track for holding said hook-shaped lever with its hook in a disengaging position and the rearward portion of said lever in an engaging position, and a spring that actuates said hook when the hook is released.

15. The combination with a mail car, of an arm adapted to handle mail bags, a vertically oscillatory bracket plate secured to the car door in which said arm is mounted, and a spring bolt for locking said plate so said arm will be horizontal, whereby when said plate is released, said arm will hang downwardly out of the way.

16. The combination with a mail car, of a horizontal oscillatory bar mounted in the door way of the car near the upper end thereof, an arm for handling mail bags that is secured at one end to said bar so as to oscillate vertically, means for locking said arm in its outwardly extending position, and means for releasing said lock, whereby the arm will swing downwardly into the car.

17. The combination with a mail car, of a horizontal oscillatory bar mounted in the door way of the car near the upper end thereof, an arm for handling mail bags that is secured at one end to said bar so as to oscillate vertically, means for locking said arm in its outwardly extending position, means for releasing said lock, whereby the arm will swing downwardly into the car, and means for mounting said cross bar in the door way of the car so that it may be reversed.

In witness whereof, I have hereunto affixed my signature in the presence of the witnesses herein named.

JAMES WOOD.

Witnesses:
N. ALLEMONG,
OLIVE BREEDEN.